United States Patent
Parfitt et al.

(10) Patent No.: US 6,851,303 B2
(45) Date of Patent: Feb. 8, 2005

(54) METHOD OF DETERMINING THRUST

(75) Inventors: Robert N Parfitt, Bristol (GB); Colin A. Whittle, Bristol (GB); Martin R Turville, Nottingham (GB)

(73) Assignee: Rolls-Royce PLC, London (GB)

(*) Notice: Subject to any disclaimer, the term of this patent is extended or adjusted under 35 U.S.C. 154(b) by 72 days.

(21) Appl. No.: 10/334,803

(22) Filed: Jan. 2, 2003

(65) Prior Publication Data

US 2003/0177824 A1 Sep. 25, 2003

(30) Foreign Application Priority Data

Jan. 15, 2002 (GB) .............................................. 0200809

(51) Int. Cl.[7] .............................................. G01M 15/00
(52) U.S. Cl. ........................................................ 73/117.4
(58) Field of Search ............................... 73/116, 117.2, 73/117.3, 117.4, 118.1, 117.1, 865.6

(56) References Cited

U.S. PATENT DOCUMENTS

| | | | |
|---|---|---|---|
| 3,788,130 A | * | 1/1974 | Ormond ..................... 73/117.4 |
| 4,034,604 A | | 7/1977 | Decher et al. |
| 4,328,703 A | * | 5/1982 | McClure et al. ............ 73/117.4 |
| 4,537,066 A | * | 8/1985 | Simpson ..................... 73/117.4 |
| 4,788,855 A | * | 12/1988 | Laskody ..................... 73/117.4 |
| 4,833,911 A | * | 5/1989 | Zeeban et al. ............. 73/117.4 |
| 5,101,622 A | * | 4/1992 | Bond .......................... 60/246 |
| 5,170,662 A | | 12/1992 | Brault et al. |
| 5,235,848 A | * | 8/1993 | Hillenbrand ................ 73/117.4 |
| 5,396,791 A | * | 3/1995 | Mollmann et al. ............ 73/116 |
| 5,589,632 A | * | 12/1996 | Chevalier et al. .......... 73/117.4 |

FOREIGN PATENT DOCUMENTS

GB    2 132 367 A    7/1984

* cited by examiner

Primary Examiner—Eric S. McCall
(74) Attorney, Agent, or Firm—Oliff & Berridge, PLC

(57) ABSTRACT

A method for determining the free-field thrust of a gas turbine engine using an enclosed gas turbine engine test facility without recourse to an outdoor gas turbine engine test facility. The method includes calculating the gas turbine engine intake momentum drag and cradle drag generated and compensating for these losses. In a further embodiment, the base drag is calculated and also compensated for.

16 Claims, 9 Drawing Sheets

| Shape | Cd |
|---|---|
|  | 1.17 |
|  | 1.16 |
|  | 1.20 |
|  | 2.30 |
|  | 2.05 |
|  | 1.55 |
|  | 1.55 |
|  | 2.00 |
|  | 2.20 |
|  | 1.60 |
|  | 1.98 |

METHOD OF DETERMINING THRUST

BACKGROUND OF THE INVENTION

1. Field of Invention

The present invention relates to a method of determining the free-field thrust of a gas turbine engine using an enclosed gas turbine engine test facility. In particular, the present invention concerns a method for calibrating an enclosed gas turbine engine test facility to determine the free-field thrust of such an engine. Furthermore, the presents invention concerns apparatus used for calibration of an enclosed gas turbine engine test facility.

2. Description of Related Art

It is sometimes necessary to accurately measure the thrust produced by a gas turbine engine, for example during certification of an engine type or during pass-off of an individual engine. The thrust of any gas turbine engine will vary according to the ambient conditions in which it operates. It is therefore necessary to standardise the thrust produced by a gas turbine engine to a static or 'free field' thrust, produced on an International Standard Day. That is to say, the thrust that would be generated if the engine were operating in an undisturbed atmosphere at precisely defined temperature, pressure and density.

A convenient method of measuring the thrust is to use an enclosed gas turbine engine test facility. Typically, such a facility comprises an enclosure housings a thrust-measuring cradle to which the gas turbine engine is mounted. Inlets in the enclosure allow a substantially undisturbed flow of air into the engine while an exhaust outlet, also known as a detuner or augmenter, provides exit means for the hot exhaust gasses produced.

The enclosed test facility offers a number of benefits. Because the engine is shielded from the elements, testing can take place in consistent conditions, regardless of weather conditions. Also, careful design minimises the environmental impact of engine testing, particularly noise. However, an enclosed test facility suffers limitations. The flow of exhaust gas into the exhaust outlet, often by design, generates an airflow through the test facility. This flow, as much as three times that through the engine, protects the detuner from the exhaust gas but also generates drag. In effect a negative thrust is created that reduces the thrust of the engine by as much as ten percent. Thus the test facility must be calibrated to indicate the thrust that the engine would produce if surrounded by a static atmosphere.

It is common practice to calibrate an enclosed test facility by "back-to-back" tests against an open-air test facility. An open-air test facility comprises a thrust cradle to which an engine is mounted and operated, supported far enough away from external influences, such as the ground, that air around the engine remains substantially unaffected during operation. In this way, the "free field" thrust of the engine can be measured. However, the procedure is costly and time consuming as the external test facility is not as flexible as the enclosed test facility. The open-air facility is, by necessity, exposed to the elements, limiting availability. Furthermore it has a greater environmental impact and may be subject to restrictions on operating times.

SUMMARY OF THE INVENTION

The present invention addresses the problems of measuring the free field thrust of a gas turbine engine using an enclosed gas turbine engine test facility, in essence providing a 'first principles' method for calculating a thrust correction which is used to derive the static thrust of the engine at a given operating point. Furthermore, by collecting the information over a range of operating conditions, a correction curve is produced to calibrate an indoor testbed without need to refer to an outdoor testbed.

According to the present invention, there is provided a method for determining the free field thrust of a gas turbine engine by use of an enclosed gas turbine engine test facility, wherein the enclosed gas turbine engine test facility comprises an enclosure having an air inlet and an exhaust outlet, there being located within the enclosure a thrust cradle having movable support means and thrust measurement means, the method including the steps of attaching the gas turbine engine to the moveable support means, operating the gas turbine propulsion engine at at least one predetermined engine operating point, measuring the thrust applied by the engine to the thrust cradle via the thrust measurement means, calculating the gas turbine engine intake momentum drag generated by airflow into the gas turbine propulsion engine intake, calculating the thrust cradle drag force generated by airflow past the moveable support means of the thrust cradle, and adding the gas turbine engine intake momentum drag and the thrust cradle drag force to the measured thrust thereby determining the free field thrust at the at least one engine operating point.

According to a further aspect of the present invention there is provided such a method comprising the further step of calculating the base drag generated by airflow past the gas turbine engine exhaust nozzle and adding the gas turbine engine intake momentum drag, the thrust cradle drag force and the base drag to the measured thrust thereby determining the free field thrust at the at least one engine operating point.

BRIEF DESCRIPTION OF THE DRAWINGS

Further detail of the invention and how it may be carried into practice will now be given with reference to the accompanying drawings in which.

DETAILED DESCRIPTION OF PREFERRED EMBODIMENTS

Figure 1:
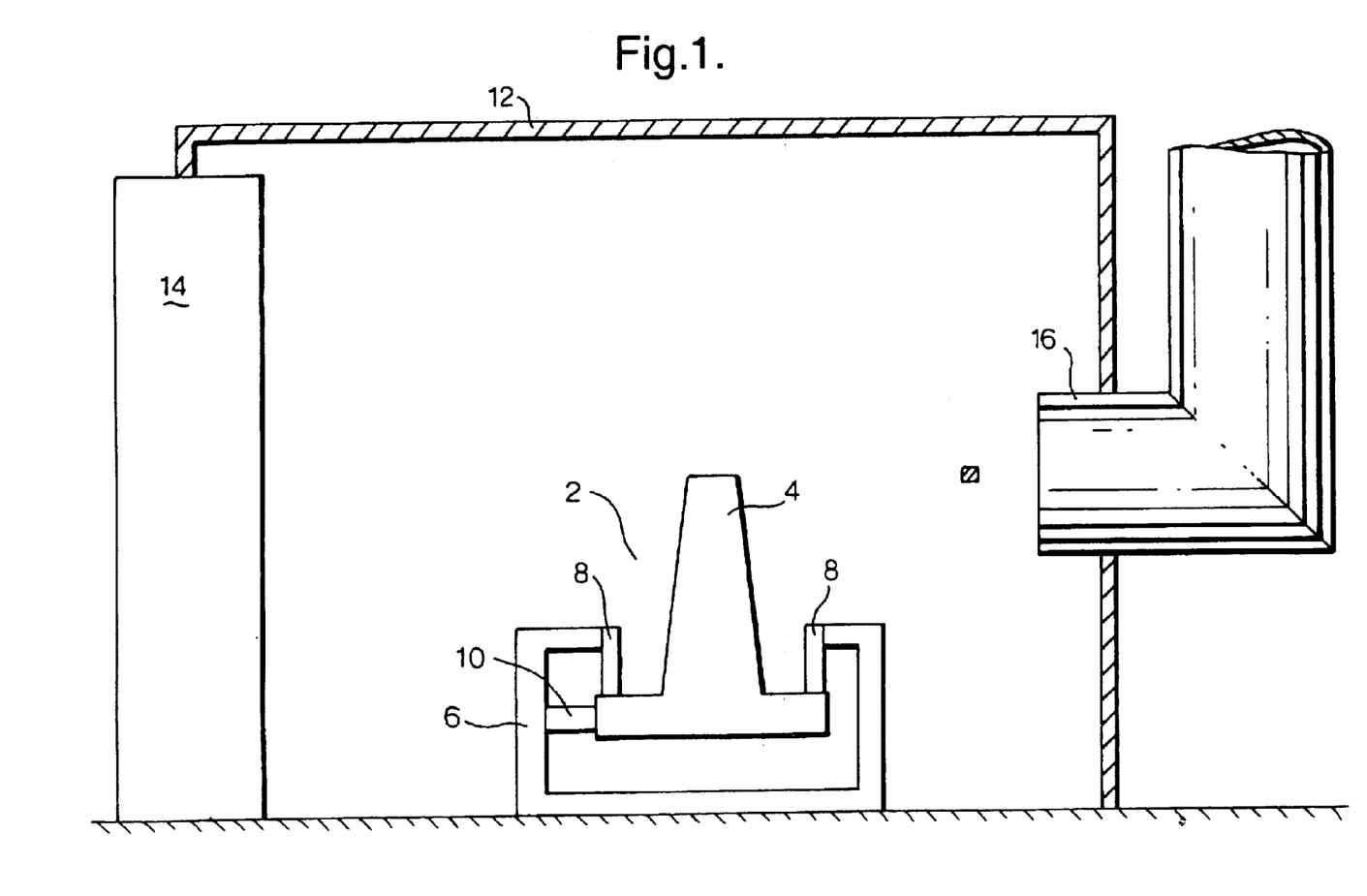
FIG. 1 shows a cross-section of a typical enclosed gas turbine engine test facility, the thrust cradle shown being simplified to aid understanding.

Turning now to the drawings, FIG. 1 illustrates a typical enclosed gas turbine engine test facility also known as an indoor test cell or indoor testbed. The facility comprises a thrust cradle 2 to which a gas turbine engine engine can be mounted. The thrust cradle comprises a moveable support means 4 mounted to a static support structure 6 by flexure plates 8. Attached between the moveable means 4 and static means 6 is a load cell 10.

The thrust cradle 2 is housed within an enclosure 12 that provides a stable environment and shelter from the elements. An air inlet 14 is provided in the enclosure 12, shaped to provide an undistorted flow of air into the enclosure 12. An exhaust outlet 16, also known as a detuner or augmenter, allows exhaust gas and entrained air to leave the enclosure 12.

Figure 2:
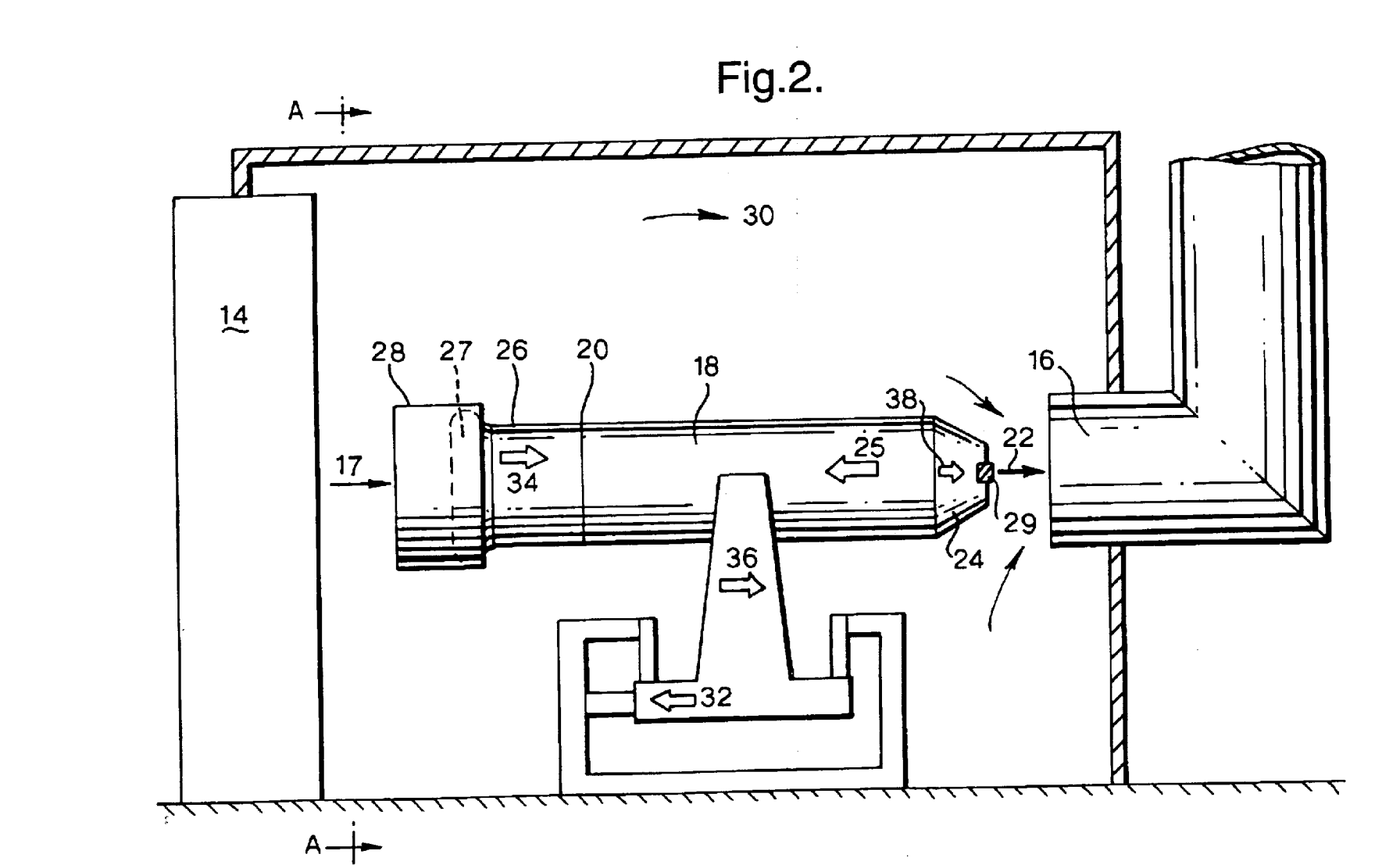
FIG. 2 shows a cross-section of the enclosed gas turbine engine test facility shown in FIG. 1 being used to test a turbofan engine, with forces and flows superimposed on the figure.

FIG. 2 shows the test facility of FIG. 1 in use. A turbofan engine 18, a type of gas turbine engine, is mounted to the thrust cradle 2. Gas turbine propulsion engines are well understood and it is sufficient for the purposes of describing the present invention to explain that an airflow 17 is drawn into the turbofan 18 via an intake 20. Within the engine (not shown) a portion of the air is compressed and combusted with fuel to produce a 'hot' exhaust stream while the remaining air is accelerated by a fan to produce a 'cold' exhaust stream. The resulting hot and cold gasses form the exhaust 22 which, in this case, is expelled via a common nozzle 24 to provide thrust 25.

The turbofan 18 is substantially unaltered for operation on the testbed. However, an 'airmeter' 26, mounted to the engine intake 20, is used to accurately measure the mass flow into the engine 18. A flared intake 27, attached forward of the airmeter 26, minimises distortion of the airflow 17 into the engine 18. A mesh 'stone/debris guard' 28 is provided in front of the flared intake 27 and airmeter 26 to prevent ingestion of objects that could damage the engine 18 during operation.

A static pressure sensor 29 is located in the exit plane of the nozzle 24, in the same horizontal plane as the engine 18 centreline. It is at least 60 cm from the walls of the enclosure 12.

During operation of the engine 18, air is drawn through the air inlet 14 into the enclosure 12 by the engine 18 and by the interaction of the engine nozzle 24 and the detuner 16. The turbofan exhaust nozzle 24 and the detuner 16 operate as an ejector nozzle, generating a region of low static pressure at the detuner 16 which demands an auxiliary airflow 30 through the facility and into the outlet 16, which it protects from the hot exhaust gas 22. Furthermore, the flow 30 generated through the enclosure 2 prevents exhaust gas 22 from being drawn into the engine intake 20, which would otherwise harm the engine 18. It is good design for the airflow 30 generated by the nozzle 24/detuner 16 to be at least equal to the airflow 17 required by the engine 18.

As previously described, the airflow 17 into the engine 18 is accelerated and exhausted through the engine nozzle 24. The thrust 25 generated applies a force to the moveable support means 4 which, restrained only by the flexure plates 8, applies a force 32 to the load cell 10. The force 32 applied to the load cell 10 is the measured thrust 25 of the engine.

A number of factors reduce the apparent measured thrust of the engine from the thrust that would be achieved in static conditions. The air flow 30 through the enclosure 12 generates three main sources of thrust reduction; Intake momentum drag 34, cradle drag 36 and base drag 38.

The present invention provides a 'first principles' method for calculating each of these sources of drag from parameters measured during engine operation.

Intake Momentum Drag

Intake momentum drag 34 arises because, with an enclosed testbed, the airflow 17 into the engine 18 is travelling faster than would be the case in static conditions, hence the work the engine 18 can apply to it is reduced. It typically generates 85–95% of the apparent thrust loss when using an indoor testbed. Intake momentum drag is calculated by measuring the velocity of the airflow 17, ahead of the airmeter 26 inlet and multiplying it by the mass flow of the airflow 17 through the airmeter 26 according to the following formula Equation 1:

Intake momentum drag (calculated in Kilonewtons, KN) = $\frac{\omega_{inlet} \times v_{inlet}}{1000}$ Where;

$W_{inlet}$ is the engine inlet mass air flow, measured in kilograms per second (kg/s)

$V_{inlet}$ is the mean airflow velocity approaching the airmeter inlet, measured in meters per second (m/S)

Figure 3:
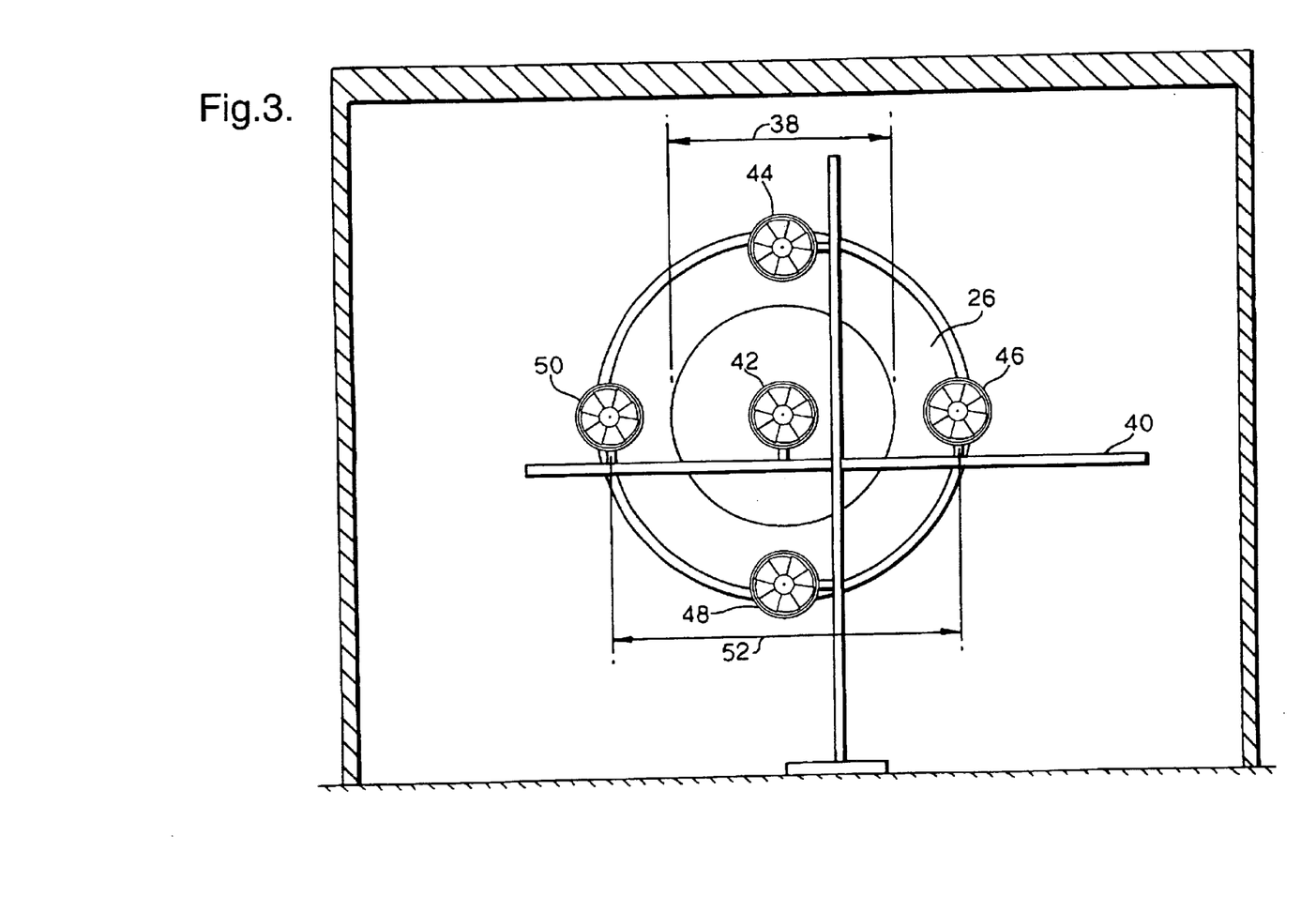
FIG. 3 shows measurement apparatus for use in carrying out the present invention.

FIG. 3 shows a view on A—A of FIG. 2. Apparatus is shown which is used to measure the velocity of the airflow 17 approaching the airmeter where the airmeter 26 throat diameter 38 is less than 1.8 m. The apparatus comprises a cruciform array 40 to which are mounted five shrouded anemometers 42,44,46,48,50. The array 40 is preferably constructed of cylindrical tubing, no more than 50 mm in diameter. The array 40 is located in a vertical plane, parallel the airmeter 26 inlet plane, positioned at a distance between two and three times the airmeter internal throat diameter 38, upstream of the inlet. A first anemometer 42 is located at the centre of the array, on the centreline of the intake 20. The remaining four anemometers 44,46,48,50 are located on a pitch circle diameter which diameter 52 is 150% the airmeter internal throat diameter 38, coaxial with the engine centreline. The anemometers are equi-angularly spaced apart.

Figure 4:
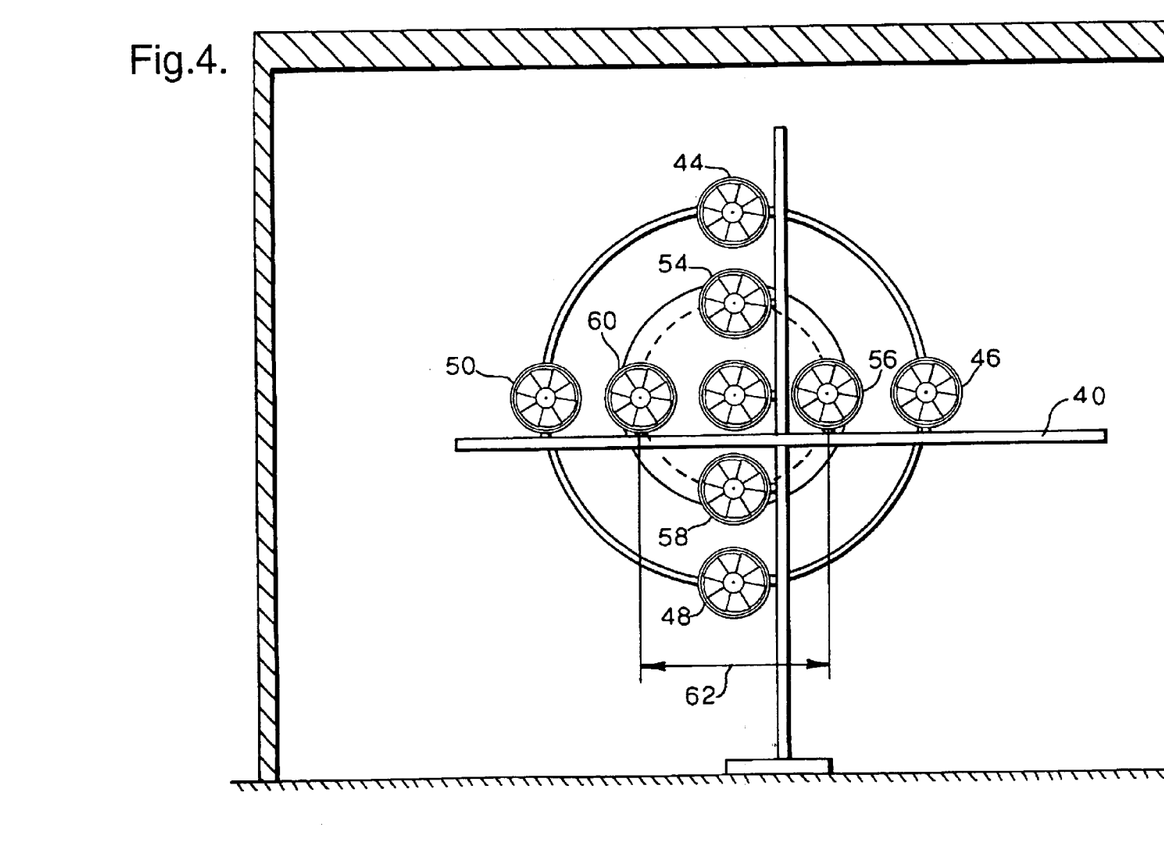
FIG. 4 shows alternative measurement apparatus for use in carrying out the present invention.

FIG. 4 shows apparatus used to calculate the approach velocity of the airflow upstream of the airmeter where the airmeter diameter is greater than 1.8 m. The apparatus is essentially the same as for FIG. 3, and like items carry like reference numbers, however, a second group of 4 anemometers 54,56,58,60 is arranged on a pitch circle diameter 62 which diameter is 75% that of the airmeter internal throat diameter 38, again located coaxial with the intake centreline. The anemometers are equi-angularly spaced apart.

During calibration/operation of the testbed the airflow velocities measured by the anemometers are averaged to give a mean approach velocity in the plane of the anemometers. At the same time, the mass of the airflow 17 into the engine 18 is measured by the airmeter. The airflow 17 mass $W_{inlet}$, and mean approach flow velocity $v_{inlet}$ are used in equation 1 to derive the intake momentum drag, referred against a known operating condition such as engine fan speed.

It should be emphasised that the calculation of intake momentum drag relates to a configuration wherein the engine 18, airmeter 26 and stone/debris guard 28 are attached to the moveable support means. If this is not the case and the stone/debris guard 28 is attached to a static structure, pressure loss through the debris guard 28 will reduce the inlet momentum drag 34 and hence increase the measured thrust of the engine 18. If using a grounded stone/debris guard, its removal is recommended and back-to-back testing should be carried out to account for fixed debris guard effects.

Cradle Drag

Cradle drag 36 is that force exerted upon the moveable support means 4 of the thrust cradle 2 by the airflow 30 through the testbed enclosure 12. This will be better understood if reference is made to FIG. 5 which shows a perspective view of the moveable support means of a thrust cradle with the stone/debris guard 28 removed for clarity. The movable support means 4 comprises a number of discrete structures 64,66. These include the mounting cradle 64 and test equipment 66 that is mounted to the moveable support means 4. During an engine test, the airflow 30 through the enclosure 12 creates a drag force on each structure 64,66 which, combined, form the cradle drag 36. The size of each drag force will depend, principally, on three factors; the area of the component 64,66 that lies normal to the airflow through the test facility, (also called the frontal blockage area, represented by the shaded area 68), the velocity of the airflow past the component, and the way in which the profile of the component interacts with the flow past it, quantified by a coefficient of drag (Cd).

The following equation is used to calculate the force exerted on a single component $$\text{Drag calculated in Kilonewtons } (KN) = \Delta P \times A \times Cd \quad \text{Equation 2}$$

Where $\Delta P$=the pressure loading, measured in Kilopascals (KPa)

A=the frontal blockage area, measured in meters squared (m$^2$)

Cd=the coefficient of drag of the component, (non-dimensional)

The pressure loading is calculated from the following equation;

Equation 3:

$$\Delta P = P \times \left[1 - \left(\frac{1}{1 + (6.0449 \times 10^{-6} \times V^2)}\right)\right]$$

Where P=cell static pressure, measured in Kilopascals (KPa)

V=airflow velocity, measured in meters per second (m/s)

The above equation is derived from Bernoulli's equation,

Equation 4:

$$\text{Dynamic pressure} = \frac{1}{2}\rho V^2$$

with $\rho$, the air density, assumed to take the value for an ISA (International Standard Atmosphere) day. This eliminates the need to measure and calculate local cell static temperatures. Any loss in accuracy is of $2^{nd}$ order significance, estimated as ±0.01% thrust change for ±20 K change in ambient temperature. However, if preferred, Bernoulli's equation can be used.

The cell static pressure P, is measured by the static pressure sensor 29.

Figure 5:
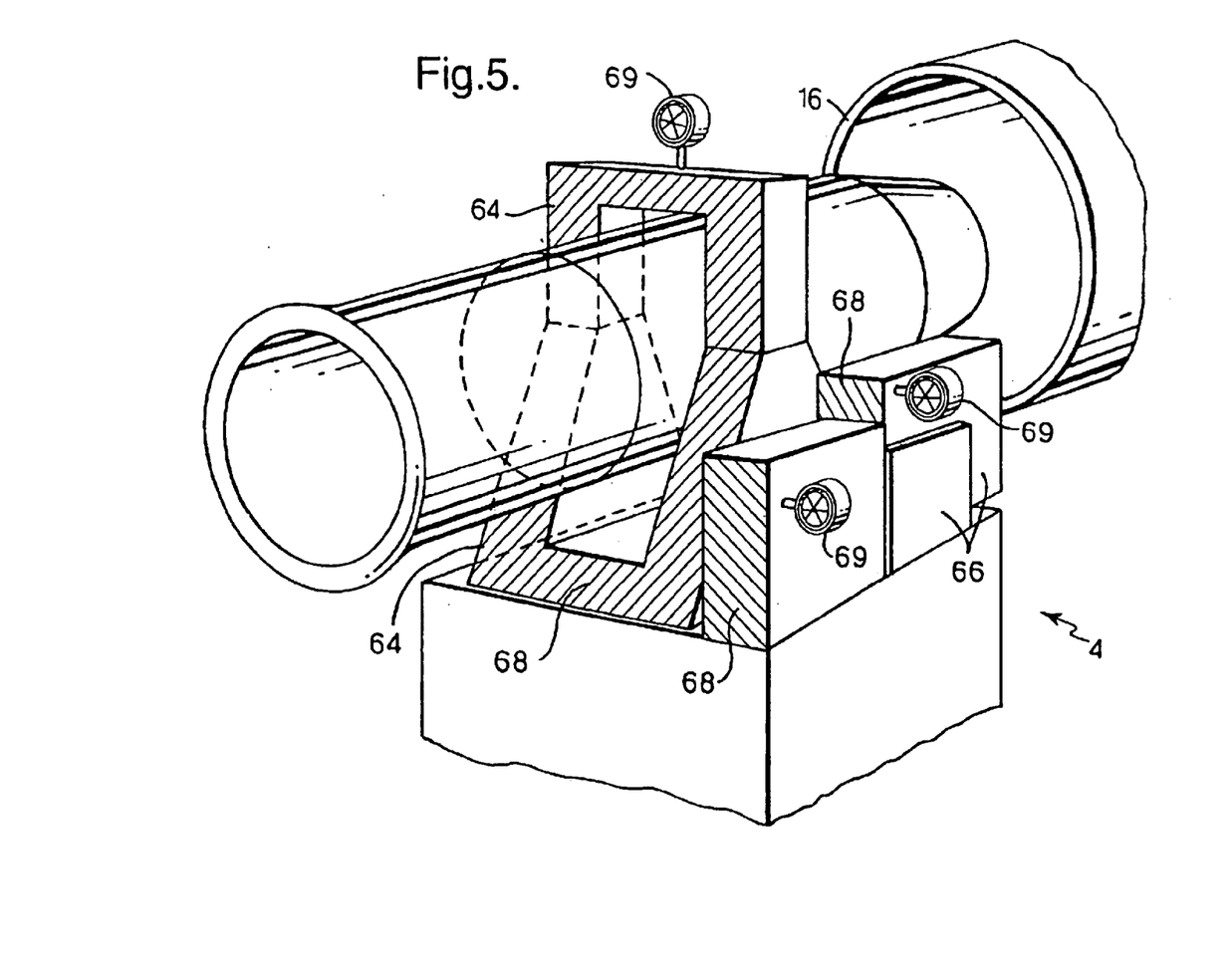
FIG. 5 shows a perspective view of the thrust cradle from the enclosed gas turbine engine shown in FIGS. 1 and 2, with some features removed for clarity.

The velocity, V of the airflow 30 through the enclosure 12 is measured by shrouded anemometer. In a preferred embodiment of the present invention, the flow 30 around the moveable support means is measured by up to 10 shrouded anemometers 69, located adjacent (approximately 0.1 m away from) the frontal blockage areas 68, evenly spread about the moveable support means 4. It is important that the flow velocity V 30 is measured such that a good indication of the flow field about the moveable support 4 means is given. Care should be taken that the anemometers 69 are not positioned in regions of disturbed flow, ie in the wake of blockages.

Where the airflow velocity adjacent the support means show a velocity distribution within ±30% of mean ($V^{mean}$), then the calculation for pressure loading is performed with the mean velocity $V_{mean}$ to provide a mean pressure loading $\Delta P_{mean}$.

The blockage area 68 of the moveable support means 4 comprises the airflow-facing geometrical area of all moving elements of the mounting cradle 64 and of the rigidly attached obstructions 66. Care must be exercised when measuring the area that regions shielded by an upstream obstruction are not included in the total blockage area. The shielded region behind a component is taken to extend to a length, $L_{wake}$, where $$L_{wake}(\text{meters}) = 5 \times A_{upstream} \quad \text{Equation 5}$$

Where $A_{upstream}$=the blockage area of the obstructing component measured in meters squared (m$^2$).

Figure 6:
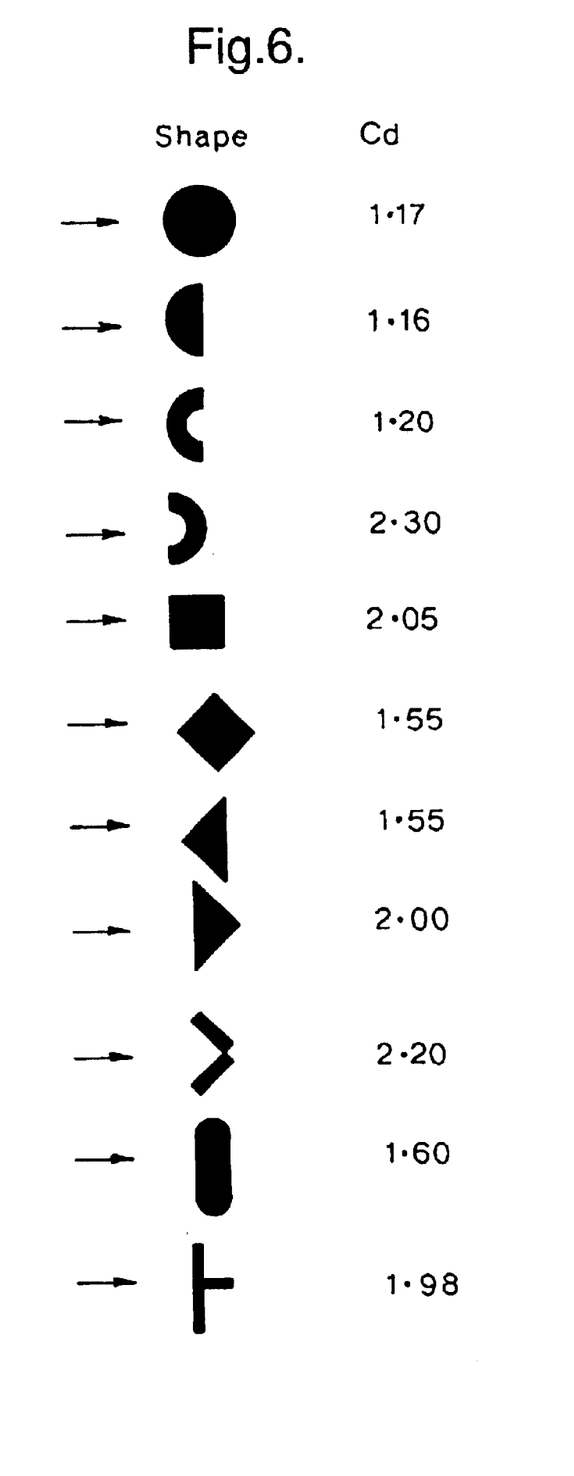
FIG. 6 shows a series of profiles and associated coefficients of drag (Cd)

The Cd of each component 64,66 is derived by comparing the profile of a component with the range of silhouettes given in FIG. 6 of the illustrations. Once an appropriate Cd is selected it is multiplied by the area of the components 64.

Where the flow velocity within the test cell about the cradle is within the given tolerance of +/−30%, the cradle drag is calculated according to the following adaptation of equation 2;

$$\Delta P_{mean} \times A_{total} \times Cd_{mean} \quad \text{Equation 6}$$

Where $A_{total}$=the total unobstructed blockage area of the moveable support means.

If flow within the test cell about the cradle lies outside the given tolerance of +/−30%, cradle drag is calculated by dividing the moveable support means into a number of components and summing the drag of each. An individual drag force is calculated for each component by measuring the air velocity adjacent each component, calculating the blockage area of each component and deriving the Cd of each component. The cradle drag is calculated according to the following equation:

Equation 7:

$$\sum_{x}^{l} (\Delta p_n \times A_n \times Cd_n)$$

Where 1 to x=the number of components comprising the moveable support means 4 and with the pressure loading $\Delta P_n$ calculated for each component according to the following equation;

Equation 8:

$$\Delta P_n = P \times \left[1 - \left(\frac{1}{1 + (6.0449 \times 10^{-6} \times V_n^2)}\right)\right]$$

where $V_n$ is the velocity adjacent the component, measured in meters per second (m/s)

Base Drag

Base drag 38 is caused by the airflow 30 through the enclosure passing over the converging nozzle 24 of the engine 18. As the airflow 30 accelerates, the static pressure in the region falls generating a force that opposes engine thrust 25.

Figure 7A:
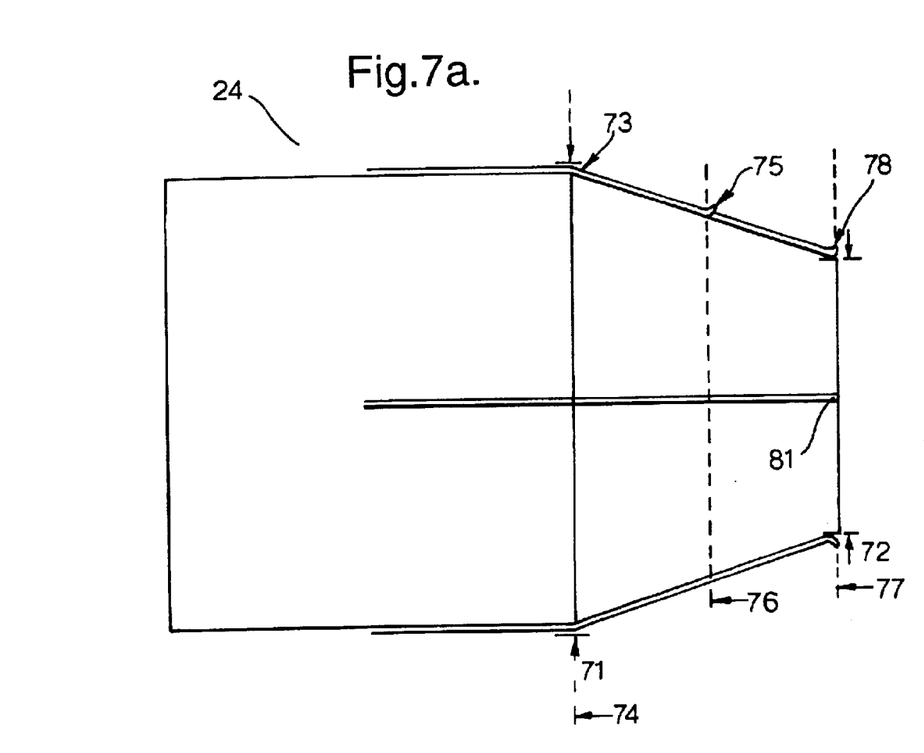
FIGS. 7a and 7b show a more detailed view of the nozzle of the turbofan engine shown in FIGS. 2 and 5, illustrating measurement apparatus for use in carrying out the present invention.
Figure 7B:
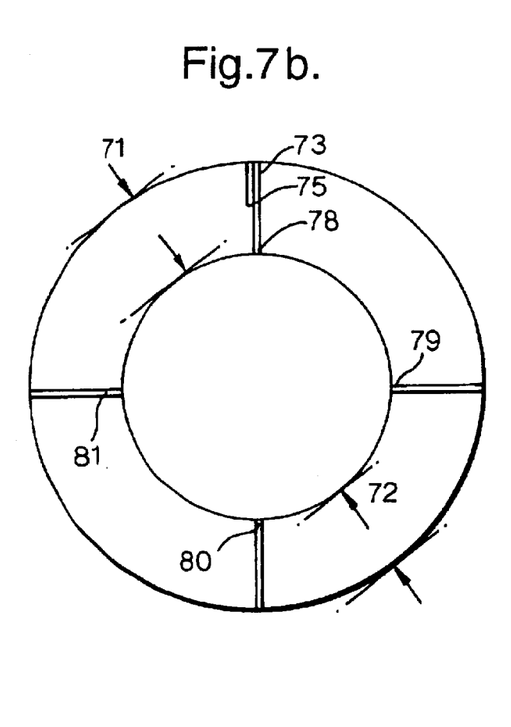

FIG. 7 shows a more detailed view of the nozzle 24 of the engine 18 of FIG. 2. FIG. 7a shows a side view of the nozzle 24. FIG. 7T shows a view on the nozzle 24 exit.

The nozzle 24 converges from an upstream diameter 71 to an exit diameter 72. Three static pressure sensors, oriented perpendicular to the exterior surface of the nozzle 24, are equispaced along the convergent nozzle 24 at the 12 o'clock position: A first 'upstream' sensor 73 is located at the most forward part of the converging nozzle 24, henceforth the 'upstream plane' 74. A second sensor 75 is located in the mid-plane 76 of the convergent nozzle 24, equidistant between the upstream sensor 73 and the exit plane 77 of the nozzle 24. A third 'exit-plane' static pressure sensor 78 is one a group of four exit plane static pressure sensors 78,79,80,81 circumferentially equispaced about the external surface of the nozzle 24 in the exit plane 77, again located perpendicular to the nozzle surface 24. These are located at the 12 o'clock position, 3 o'clock position, 6 o'clock position and 9 o'clock position.

In the event that this configuration is impractical, such as engines mounted from overhead pylons in the 12 o'clock position (not shown) the configuration can be angularly advanced, for example by forty five degrees so that the sequence begins at the 'half-past-one' position.

Base drag is calculated from the following equation:

$$\text{Base drag} = (A_{nozzle\ entry} - A_{nozzle\ exit}) \times (P - P_{s\ nozzle}) \quad \text{Equation 9}$$

Where $A_{nozzle\ entry}$=the nozzle area at the upstream end of the convergent nozzle, measured in meters squared (m²), $A_{nozzle\ exit}$=the nozzle area at the downstream end of the convergent nozzle, measured in meters squared (m²), P=the static pressure in the test cell, measured in Kilopascals (Kpa) and $P_{s\ nozzle}$=the static pressure adjacent the nozzle, measured in Kilopascals (Kpa).

The static pressure is measured by the same static pressure sensor 29 as used in the calculation for cradle drag. The static pressure adjacent the nozzle, $P_{s\ nozzle}$ is measured by the apparatus shown in FIG. 7.

$P_{s\ nozzle}$ is the average of the first pressure sensor 73, the second pressure sensor 75 and the mean ($P_{exit_{mean}}$) of the exit plane sensors 78,79,80,81 according to the following equation:

Equation 10:

$$P_{snozzle} = \frac{P_{upstream} + P_{mid-nozzle} + P_{exit_{mean}}}{3}$$

The overall calculated thrust correction is the sum of the three components, noting that on a well designed test facility, inlet momentum drag will account for approx 85–95% of this total value. In these circumstances, a typical thrust correction component for an indoor test facility is likely to be ideally in the region of 1.0%–5.0% of gross thrust.

In a preferred embodiment of the present invention, the engine 18 is accelerated and decelerated to produce a pair of thrust curves, a 'long' performance curve and a 'short' performance curve. The long curve consists, typically, of 13 points taken in the following order:—85% (engine speed), 91%, 97%, 100%, 94%, 88%, 80%, 75%, Idle, 40%, 50%, 60%, 70%. The short curve consists of the first 6 points of the long curve, 85%, 91%, 97%, 100%, 94%, and 88%. The engine is first stabilised at 85% engine speed for approximately 10 minutes. The long performance curve is then carried out; the engine being held at each operating point for 5 minutes before two steady-state scans are acquired of those parameters being measured. Preferably, the engine is then shut down for two hours. The short performance curve is then run again with the engine being held at each operating point for 5 minutes before two steady-state scans are acquired of those parameters being measured.

From the parameters measured, a total overall thrust correction is calculated for each point on the long and short performance curves. From this information, a total aerodynamic thrust correction characteristic is created for use in a performance analysis or pass-off programme. This correction is applied against a parameter such a fan speed, HP spool speed, inlet airflow, inlet flow function etc.

It will be understood that the above description is one example of how the present invention may be put into practices and is not intended to limit the scope of the present invention.

Figure 8:
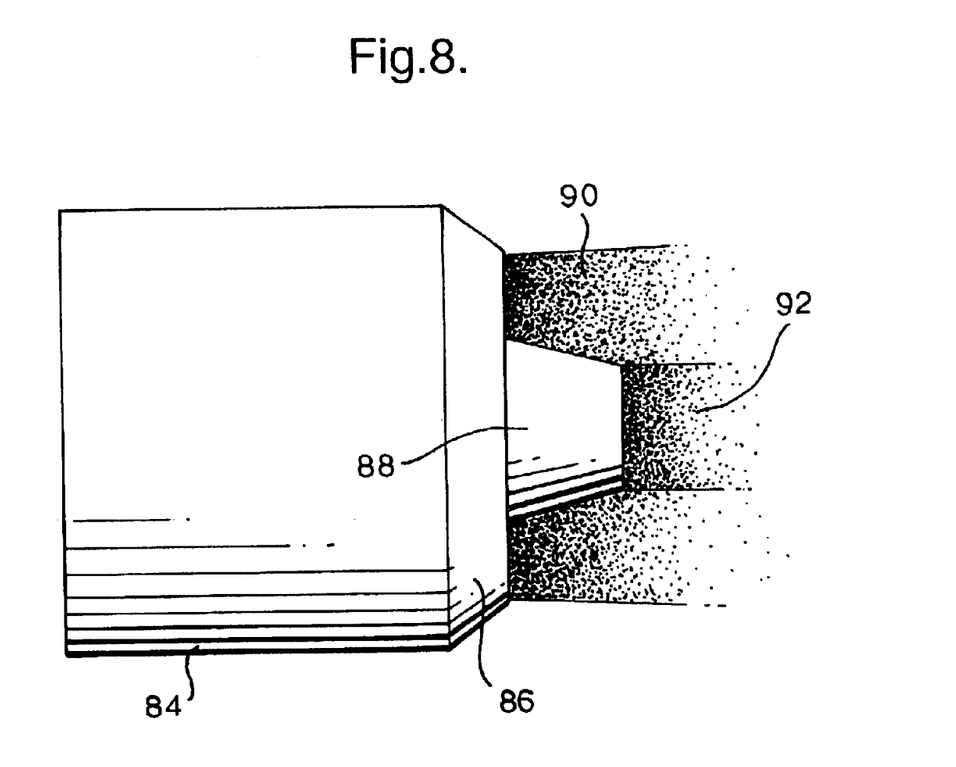
FIG. 8 illustrates an alternative configuration of turbofan and FIG. 9 illustrates alternative measurement apparatus for carrying out the present invention.

It should be emphasised that this derivation of base drag is for use where there is a common exhaust nozzle 24 for both hot and cold gas streams. In the case of turbofans with separate nozzles for the hot and cold gas streams, the base drag term will be reduced. This will be better understood if reference is made to FIG. 8 which shows g dual nozzle turbofan. The turbofan 84 has a cold annular nozzle 86 surrounding a circular hot nozzle 88. During operation, the cold exhaust stream 90 surrounds the hot exhaust gas 92 issuing from the hot nozzle 88. Because the cold exhaust stream 90 shields the hot nozzle 88 from the gas flow 30 through the testbed, there is no significant base drag 38 on the hot nozzle 88 although the gas flow 30 through the testbed will impinge on the cold nozzle 86. Because the cold nozzle is further upstream from the detuner 16 and the flow 30 velocity lower, the base drag term is significantly reduced when compared with a common nozzle 24. It may therefore be possible, subject to analysis, to exclude the term from the overall thrust correction. Nevertheless, if the term is included, it will be necessary to consider the cold nozzle 86 only.

Furthermore, the apparatus used to measure flow 17 velocity upstream of the airmeter is one example of how the airflow 17 can be measured. It will be understood this is not intended to limit this to only the apparatus described, for example, where there is suitable structure (not shown) within the test cell upstream of the engine 18, it may be preferable to mount the anemometers (42..60) directly to the structure, eliminating the need for the cruciform 40.

Figure 9:
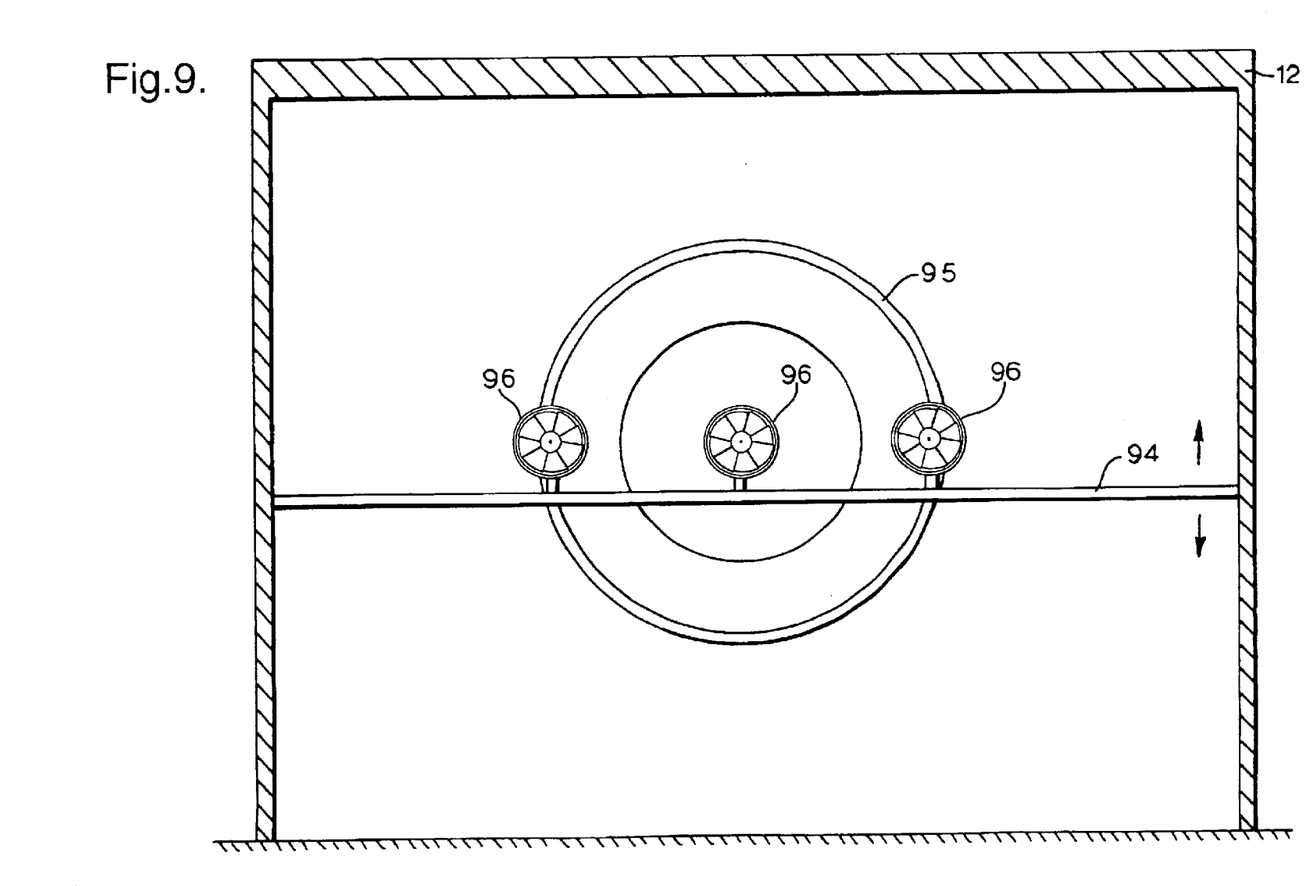

In another embodiment, shown in FIG. 9, the cruciform 40 is replaced with a vertically traversing boom 94 extends across the test cell 12 at a distance from the front face of the airmeter 95 of at least twice the internal diameter of the airmeter 95. The traversing boom 94 is equipped with three or five anemometers 96 depending upon the internal diameter of the airmeter. In operation, the boom 94 is traversed vertically and measurements taken at points corresponding to the measurement points achieved by the fixed points of the cruciform apparatus shown in FIGS. 4 and 5. This traversing device 94 enables the measurement of a greater array of velocity points that enables full contour profile plotting of test cell airflow velocities.

In a further alternative, the airflow through the facility can be derived mathematically using computational fluid dynamics (CFD) (not shown) and boundary conditions from anemometers positioned about the thrust cradle and airmeter 26 (not shown). The use of the traversing boom 94 to enable full contour plotting of test cell airflow enhances the CFD process.

What is claimed is:

1. A method for determining free field thrust of a gas turbine engine by use of an enclosed gas turbine engine test facility, wherein the enclosed gas turbine engine test facility comprises an enclosure having an air inlet and an exhaust outlet, there being located within the enclosure a thrust cradle having movable support means and thrust measurement means, the method comprising:

attaching the gas turbine engine to the moveable support means;

operating a gas turbine propulsion engine at at least one predetermined engine operating point;

measuring thrust applied by the engine to the thrust cradle via the thrust measurement means;

calculating gas turbine engine intake momentum drag generated by airflow into the gas turbine propulsion engine intake;

calculating a thrust cradle drag force generated by airflow past the moveable support means of the thrust cradle; and adding the gas turbine engine intake momentum drag and the thrust cradle drag force to the measured thrust thereby determining the free field thrust at the at least one engine operating point.

2. A method of determining the free field thrust of a gas turbine engine by use of an enclosed GPTE test facility as claimed in claim 1, further comprising calculating base drag generated by airflow past a gas turbine engine exhaust nozzle and adding the gas turbine engine intake momentum drag, the thrust cradle drag force and the base drag to the measured thrust thereby determining a free field thrust at the at least one engine operating point.

3. A method determining the free field thrust of a gas turbine engine by use of an enclosed gas turbine engine test facility as claimed in claim 1 wherein the gas turbine engine is operated at a plurality of discrete operating points, the free field thrust of the gas turbine engine is determined at the said operating points and a curve is generated through the operating points of total overall thrust correction.

4. A method as claimed in claim 1, wherein the intake momentum drag is calculated by measuring the inlet air mass flow ($W_{inlet}$ kg/s), measuring the flow velocity at a plurality of locations upstream of the inlet, deriving the mean inlet velocity ($V_{inlet}$ m/s) and then using the following equation:

$$\text{Intake momentum drag} = \frac{W_{inlet} \times V_{inlet}}{1000}.$$

5. A method as claimed in claim 4 wherein the flow velocity is measured in a plane parallel the plane of the engine intake, at a distance of between 2 and 3 times the intake throat diameter upstream of the engine intake.

6. A method as claimed in claim 5 wherein for a GTE having an intake throat diameter of 1.8 m or less, the flow velocity is measured at 9 locations.

7. A method as claimed in claim 5 wherein for a GTE having an intake throat diameter of more than 1.8 m, the flow velocity is measured at 9 locations.

8. A method as claimed in claim 5 wherein the flow velocity is measured at a first point on the intake centreline, and at a further 4 points located equidistant from one another on a diameter, which diameter is 150% that of the intake throat diameter, coaxial with the intake.

9. A method as claimed in claim 8 wherein the flow velocity is measured at a further 4 points located equidistant from one another on a diameter which diameter is 75% the intake throat diameter, coaxial with the intake.

10. A method as claimed in claim 1, wherein the thrust cradle drag force is calculated by calculating pressure loading, $\Delta P$ on the moveable support means of the support cradle, measuring a total unobstructed blockage area, $A_{total}$ of the moveable support means, calculating a mean drag coefficient, $Cd_{mean}$ of the moveable support means and then using the following equation:

$$\Delta P \times A_{total} \times Cd_{mean}.$$

11. A method as claimed in claim 10, wherein the pressure loading, $\Delta P$ is calculated by measuring the cell static pressure, P, measuring the mean airflow velocity $V_{mean}$ adjacent the movable support means and then using the following equation $$\Delta P = P \times \left[1 - \left(\frac{1}{1 + (6.0449 \times 10^{-6} \times V_{mean}^2)}\right)\right].$$

12. A method as claimed in claim 1, wherein the thrust cradle drag force is calculated by dividing the moveable support means into a number of components, x, calculating a pressure loading, $\Delta P_R$ on each component, measuring an unobstructed blockage area, $A_n$ of each component, deriving a drag coefficient, $Cd_n$ of each component and then using the following equation:

$$\sum_{x}^{t} (\Delta p_n \times A_n \times Cd_n).$$

13. A method as claimed in claim 12, wherein the pressure loading for each component is calculated by measuring a cell static pressure, P, measuring an airflow velocity $V_n$ adjacent the component and then using the following equation:

$$\Delta P_n = P \times \left[1 - \left(\frac{1}{1 + (6.0449 \times 10^{-6} \times V_n^2)}\right)\right].$$

14. A method as claimed in claim 2, wherein the base drag is calculated by measuring a static pressure in a test cell, P, measuring the static pressure adjacent an external surface of a converging engine nozzle exposed to airflow through the enclosure at at least one point in an upstream plane of the nozzle $P_{upstream}$, at at least one point in a mid-plane of the nozzle, $P_{mid-nozzle}$, and measuring an average static pressure adjacent the external surface of the converging engine nozzle exposed to airflow through the enclosure in an exit plane of the nozzle, $P_{exit\ mean}$ and using the following equation:

$$\text{Base drag} = (A_{nozzle\ entry} - A_{nozzle\ exit}) \times (P - P_{s\ nozzle})$$

where $A_{nozzle\ entry}$=the nozzle area at the upstream end of the convergent nozzle, $A_{nozzle\ exit}$=the nozzle area at the downstream end of the convergent nozzle, and $$P_{snozzle} = \frac{P_{upstream} + P_{mid-nozzle} + P_{exit_{mean}}}{3}.$$

15. A method as claimed in claim 14 wherein the average static pressure adjacent the external surface of the converging engine nozzle exposed to airflow through the enclosure in the exit plane of the nozzle, $P_{exit\ mean}$ is measured at a plurality of points, equi-angularly spaced about the external surface of the nozzle in the exit plane of the nozzle.

16. A method as claimed in claim 15 wherein the average static pressure adjacent the external surface of the converging engine nozzle exposed to airflow through the enclosure in the exit plane of the nozzle, $P_{exit\ mean}$ is measured at four points, equi-angularly spaced about the external surface of the nozzle in the exit plane of the nozzle.

\* \* \* \* \*